United States Patent
Roy et al.

(10) Patent No.: US 10,819,420 B2
(45) Date of Patent: Oct. 27, 2020

(54) MULTIPATH SATELLITE BACKBONE

(71) Applicants: Satyajit Roy, Gaithersburg, MD (US); George Choquette, Potomac, MD (US)

(72) Inventors: Satyajit Roy, Gaithersburg, MD (US); George Choquette, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 177 days.

(21) Appl. No.: 16/155,586

(22) Filed: Oct. 9, 2018

(65) Prior Publication Data
US 2020/0112363 A1    Apr. 9, 2020

(51) Int. Cl.
| H04B 7/185 | (2006.01) |
| H04L 12/721 | (2013.01) |
| H04L 12/707 | (2013.01) |
| H04W 28/02 | (2009.01) |
| H04W 40/12 | (2009.01) |
| H04L 29/06 | (2006.01) |

(52) U.S. Cl.
CPC ......... *H04B 7/18534* (2013.01); *H04L 45/24* (2013.01); *H04L 45/38* (2013.01); *H04L 69/163* (2013.01); *H04W 28/0284* (2013.01); *H04W 28/0289* (2013.01); *H04W 40/12* (2013.01)

(58) Field of Classification Search
CPC ........................... H04B 7/18513; H04W 24/10
See application file for complete search history.

(56) References Cited

U.S. PATENT DOCUMENTS

| 9,264,353 | B2 | 2/2016 | Krishnaswamy et al. |
| 2003/0123481 | A1 | 7/2003 | Neale et al. |
| 2013/0077501 | A1* | 3/2013 | Krishnaswamy ....... H04L 69/14 370/252 |
| 2018/0191604 | A1* | 7/2018 | Bartlett ................... H04L 45/24 |

FOREIGN PATENT DOCUMENTS

| EP | 1175050 A3 | 8/2003 | |
| EP | 1175050 B1 * | 3/2006 | .......... H04L 45/306 |
| EP | 1786153 A2 | 5/2007 | |

OTHER PUBLICATIONS

Non-Final Office Action for U.S. Appl. No. 16/155,549 dated Jun. 12, 2020.

(Continued)

*Primary Examiner* — Ricky Q Ngo
*Assistant Examiner* — Stephen N Steiner
(74) *Attorney, Agent, or Firm* — Capitol City Techlaw; Jasbir Singh

(57) ABSTRACT

A method for providing a multipath satellite backbone is disclosed. The method includes: creating sub-backbone flows over multipaths between a first peer and a second peer, wherein each of the sub-backbone flows is associated with one of the multipaths; retrieving a policy corresponding to each of the multipaths, the first peer and the second peer; receiving a transport metric for at least one of the multipaths; calculating distribution weights for the sub-backbone flows based on the policy and the transport metric; and transporting traffic over the sub-backbone flows based on the distribution weights, wherein at least one of the multipaths is relayed by a satellite.

19 Claims, 7 Drawing Sheets

(56) References Cited

OTHER PUBLICATIONS

International search report for International Application No. PCT/US2019/055024.
Taleb et al: "Explicit Load Balancing Technique for NGEO Satellite IP Networks With On-Board Processing Capabilities", IEEE/ACM Transactions on Networking, IEEE/ACM, New York, NY, US, vol. 17, No. 1, Feb. 1, 2009, pp. 281-293, XP011246763, ISSN: 1063-6692.
International Search Report for PCT Application No. PCT/US2019/055015.

* cited by examiner

MULTIPATH SATELLITE BACKBONE

FIELD

A system and method to provide communications over a backbone using multiple communication paths in a satellite-only network or hybrid satellite-terrestrial network is disclosed. In particular, the system and method disclose splitting a backbone's traffic flow into multiple paths simultaneously to maximize resource efficiency, bonding based throughput increase, resiliency and the like. The multipath satellite backbone and traffic splitting policy is transport metric, connection metric and policy aware.

BACKGROUND

In a satellite communication system, a multipath satellite backbone is not known. A backbone is a leg of a network, which interconnects various pieces of the network, for example, by providing a path for an exchange of information or traffic flow between different subnetworks of the network. Also, the bonding and redundancy solutions for a prior art satellite backbone are not transport and link network aware. As such, the prior art fails to provide congestion control and efficient resource usage of multiple satellite paths between a remote site and a satellite hub. Moreover, the prior art satellite backbones fail to take advantage of the network and link state.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings provide a system and method for providing a backbone over multiple communication paths in a satellite-only network or hybrid satellite-terrestrial network. The creating, usage and managing of the multi-path backbone may be policy based, and satellite transport and link aware. In some embodiments, a backbone may move around/between multiple available paths. The multi-path backbone may be based on a plurality of sub-backbone flows having, for example, a one-to-one correspondence between the sub-backbone flows and each path used by the multi-path backbone.

A method for providing a multipath satellite backbone is disclosed. The method includes: creating sub-backbone flows over multipaths between a first peer and a second peer, wherein each of the sub-backbone flows is associated with one of the multipaths; retrieving a policy corresponding to each of the multipaths, the first peer and the second peer; receiving a transport metric for at least one of the multipaths; calculating distribution weights for the sub-backbone flows based on the policy and the transport metric; and transporting traffic over the sub-backbone flows based on the distribution weights, wherein at least one of the multipaths is relayed by a satellite.

Additional features will be set forth in the description that follows, and in part will be apparent from the description, or may be learned by practice of what is described.

DRAWINGS

In order to describe the way, the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail using the accompanying drawings.

Figure 1A:
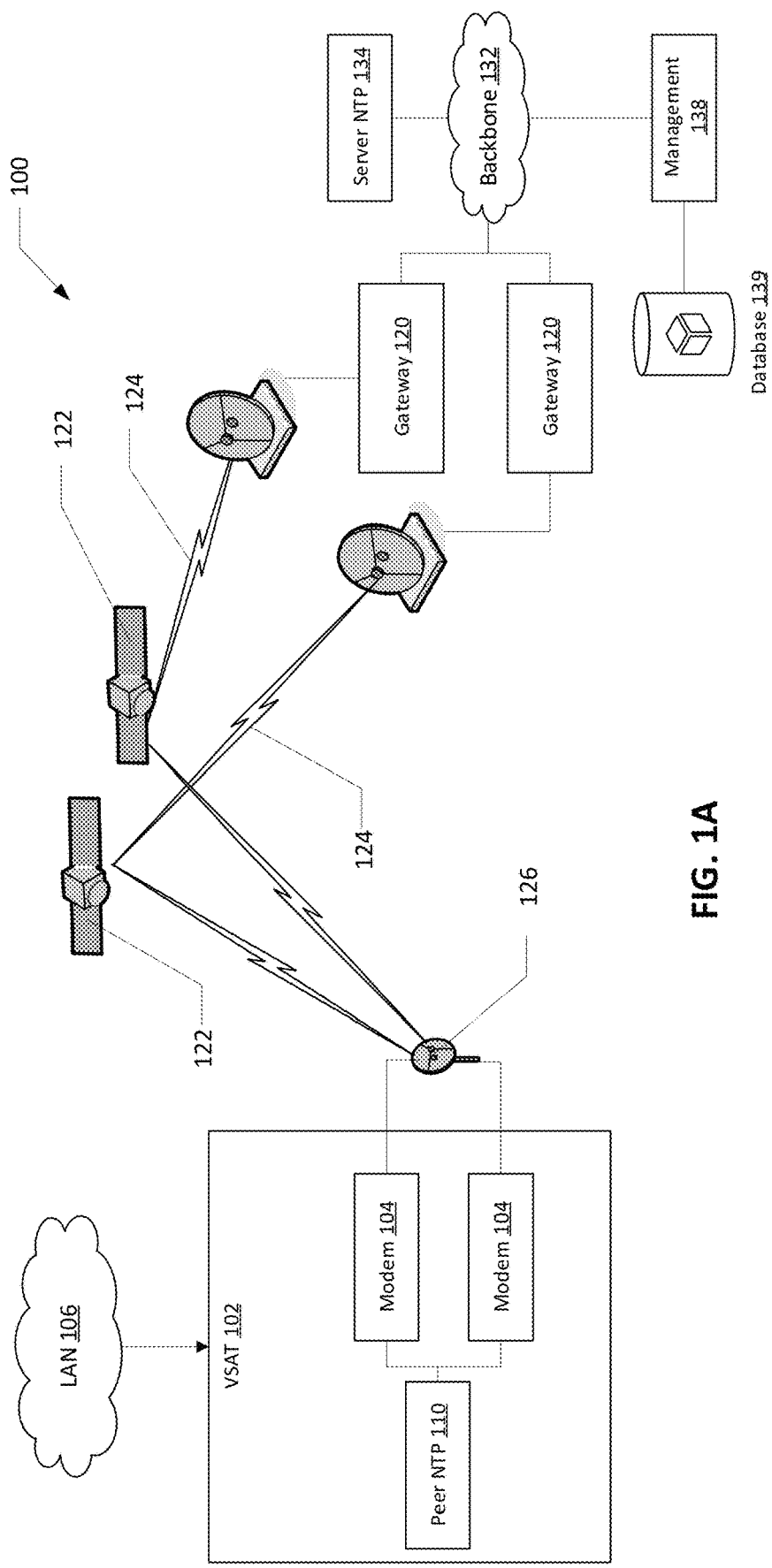
FIG. 1A illustrates an exemplary network including multiple network paths.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present teachings provide a system and method for providing a backbone over multiple communication paths in a satellite-only network or hybrid satellite-terrestrial network. The creating, usage and managing of the multi-path backbone may be policy based, and satellite transport and link aware. In some embodiments, a backbone may move around/between multiple available paths.

The present teachings use an exemplary two path architecture, but the disclosure is applicable where more than two paths are available. In some embodiments, from the network layer perspective, claims are similarly applicable to Layer 3 and Layer 2 traffic including varieties of Layer 3 IP protocols.

FIG. 1A illustrates an exemplary network including multiple network paths.

A network 100 may include a VSAT 102 (or an indoor unit (IDU) connected to a peer Network Transport Processor (NTP) 110 for establishing network paths 124. The peer NTP 110 may logically, physically or functionally include modems 104. In exemplary embodiments, the peer NTP 110 may be connected to a Local Area Network (LAN) 106. The peer NTP 110 may maintain IP addresses for devices (not shown) connected to the LAN 106 across the network paths 124.

The modems 104 may have one to one correspondence with network paths 124. In exemplary embodiments, the peer NTP 110 and the modems 104 may be hosted in one box or device. In exemplary embodiments, the peer NTP 110 and the modems 104 may be hosted in multiple boxes or devices. In exemplary embodiments, the peer NTP 110 may be disposed in a first device (not shown) while the modems 104 may be disposed in a second device (not shown) different than the first device. In exemplary embodiments, the peer NTP 110 and each of the modems 104 may be hosted in a different device.

In exemplary embodiments, communication link characteristics of each of the network paths 124 can take various forms. The network paths 124 may be of same characteristics or can be different. The network paths 124 may be in different carrier frequency bands, for example, Ka, Ku, L, Q, X, or V bands. The network paths 124 may be different in type, for example, cellular, satellite or terrestrial. The network paths 124 may be relayed through different satellite constellations, for example, Geosynchronous Earth Orbit (GEO), Medium Earth Orbit (MEO), Low-Earth Orbit (LEO), multiple satellites of same constellation, or the like. The network paths 124 may use different satellite transport types, for example, Time Division Multiple Access (TDMA), Single Channel per Carrier (SCPC), Time Division Multiplex (TDM) or the like.

An antenna installation 126 may be determined by the choice or characteristics of network paths 124. For example, the antenna installation 126 may include a parabolic antenna, a phased-array antenna, multiple antennas, or the like. In some embodiments, a phased array or mechanically steered/tracking antenna may be used to hop between satellites. In some embodiments, an outdoor unit with multi-carrier capability may be used. The network paths 124 from a single remote site may land on a single hub/gateway 120 or different hubs/gateways 120. The different hubs/gateways 120 may be co-located or may be geographically separated.

By using different types of links, for example, different antennas, different transport types, different carrier frequency bands, and the like, the network paths 124 may provide one or more Multi-path Backbones (MP-BBs), for example, a different MP-BB for each traffic class being communicated between the peer NTP 110 and the server NTP 134. Each of MP-BBs can request variations in connectivity needs, for example, by protocol, by latency, by jitter, and the like. With these variations, there can be large number of different configurations possible. The embodiments disclosed herein present a few of configuration options to effectuate a transport aware multi-path backbone.

In some embodiments, the network 100 may include a satellite 122 or a plurality of satellites 122 of the same or different types and simultaneous use of both occurs. In some embodiments, the network 100 may use an antenna installation 126 (Outdoor Unit (ODU)) with a single antenna. The network paths 124 may be served by hubs/gateways 120 that are geographically distributed. A server NTP 134 may connect the LAN 106 to an external network 136, such as, the Internet. The server NTP 134 may be deployed in an interconnect 132 to connect with the external network 136. The server NTP 134 may keep network addressing, for example, Internet Protocol (IP) addresses, intact across movement between the network paths 124. The hubs/gateways 120 connect to the server NTP 134 to maintain IP addressing between the LAN 106 and the external network 136 (see FIG. 1B). The carrier frequency band for the network paths 124 may be the same, for example, the Ka band. In some embodiments, the carrier frequency for the network paths 124 may be different. The peer NTP 110 uses awareness of the transport links for selection of the network paths 124.

The network functions implemented by the server NTP 134 may include TCP spoofing, header and payload compression and other satellite optimization aspects. The server NTP 134 provides transport aware Policy based routing. The server NTP 134 on a hub/gateway side of the network paths 124 may provide the same functions on a link from the hub/gateway 120 to the VSAT 102 (also known as a forward link). The transport state awareness helps in better QoS, maintaining capacity efficiency and performance throughput for the network paths 124. The transport state may use metrics such as Packet Loss Rate (PLR), Modulation and Coding (MODCOD), congestion level, interface cost, latency, jitter. In exemplary embodiments, a Network Management System (NMS) 138 may connect to the server NTP 134 via the interconnect 132. In exemplary embodiments, the NMS 138 may connect to the peer NTP 110 via one or more of the network paths 124. The NMS 138 may manage a database 139 including, for example, NTP policies, NTP firmware, NTP software, or the like.

Figure 1B:
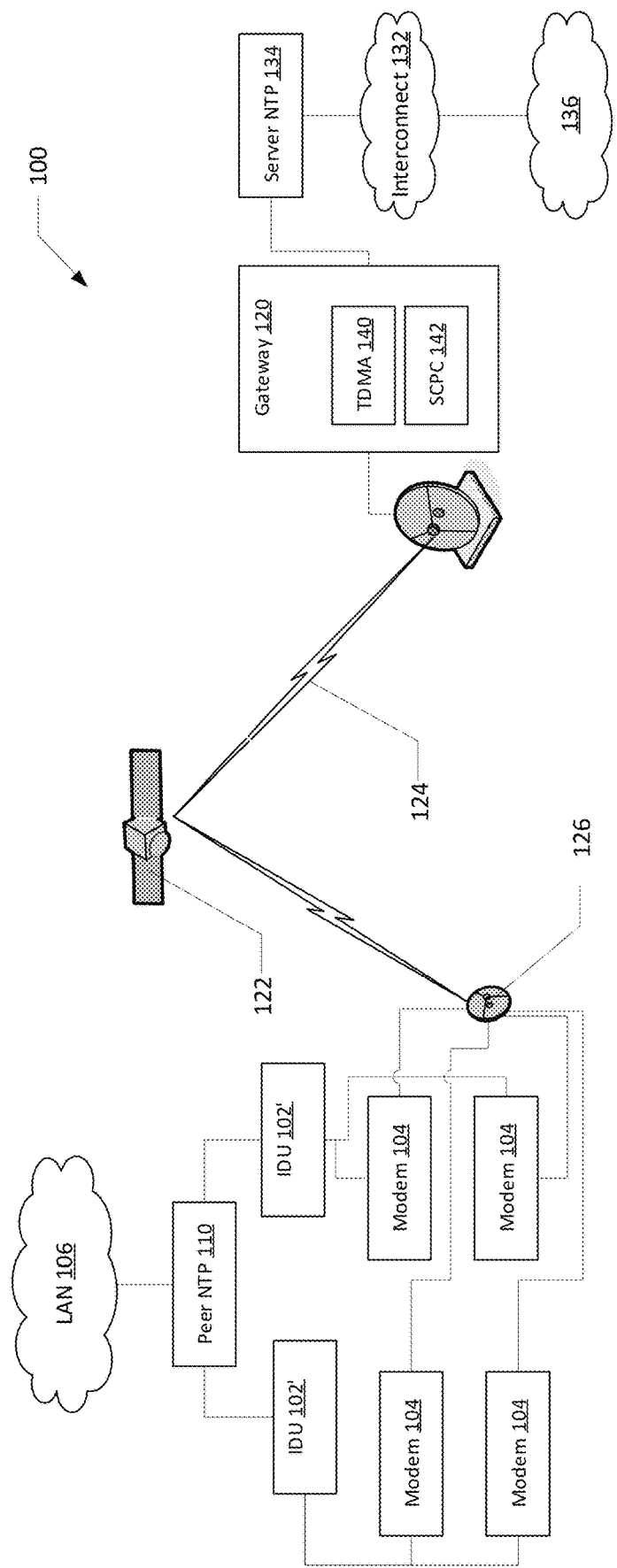
FIG. 1B illustrates an exemplary network including multiple network paths.

FIG. 1B illustrates an exemplary network including multiple network paths.

In FIG. 1B, the network paths 124 are provided by using different transport types. For example, the network paths 124 may include a Time Division Multiple Access (TDMA) path using a TDMA unit 140 and a Single Channel per Carrier (SCPC) using a SCPC unit 142. Other channel access types, for example TDM channel units (not shown), may also or instead be used. The TDMA unit 140 and the SCPC unit 142 are connected to the server NTP 134 to provide a transport type agnostic view to the interconnect 132. In exemplary embodiments, the TDMA unit, the SCPC unit 142, and the server NTP 134 may be co-hosted with the gateway 120, and the different transport type paths land on one gateway. In the embodiment of FIG. 1B, the hub/gateway 120 connects to the interconnect 132 via the server NTP 134, rather than directly to the interconnect 132 as illustrated in FIG. 1A.

Figure 1C:
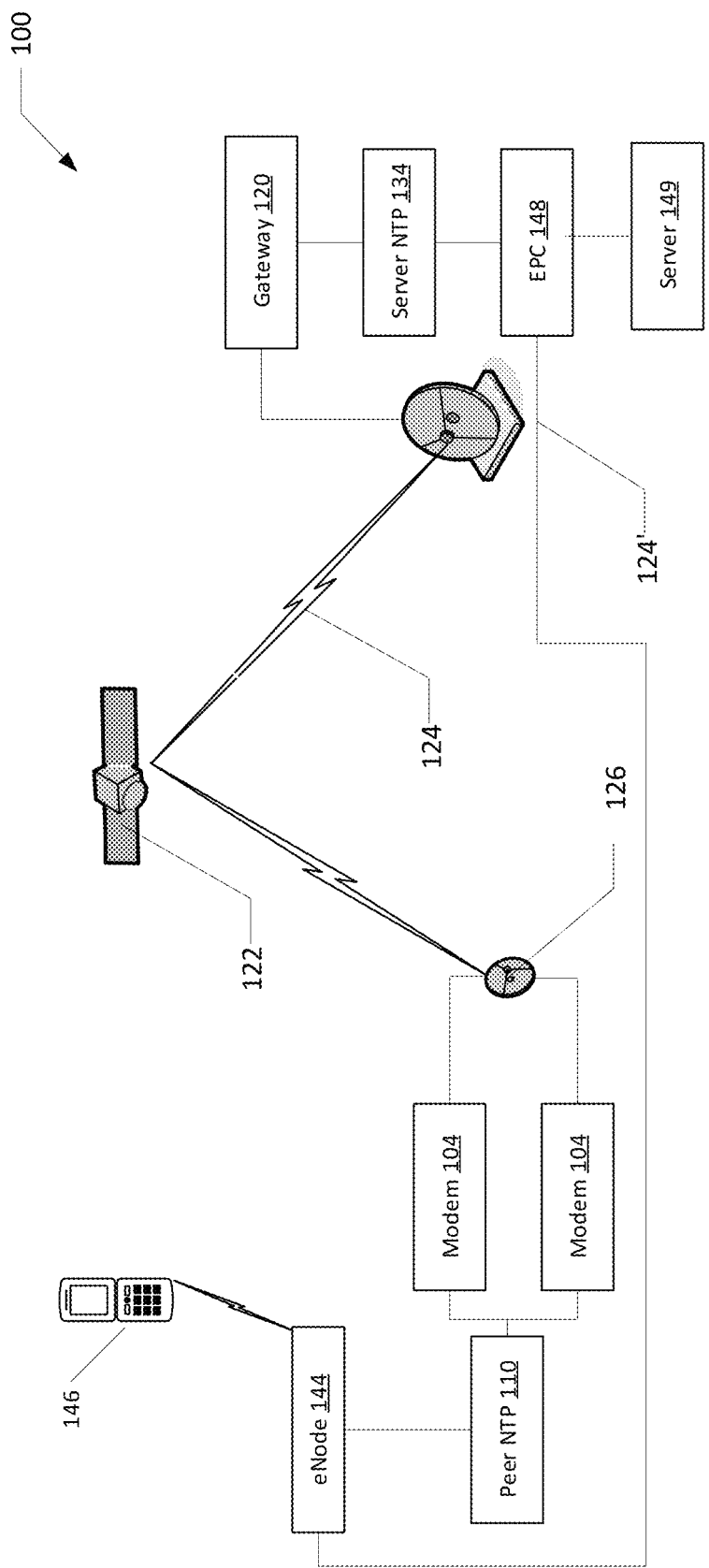
FIG. 1C illustrates an exemplary network including multiple network paths to support an enhanced Node B according to various embodiments.

FIG. 1C illustrates an exemplary network including multiple network paths to support an enhanced Node B according to various embodiments.

In this configuration, an enhanced Node B (eNodeB) 144 and an EPC 148 are provided with NTP functionality. In this embodiment, the NTP functionality is implemented in the eNodeB and the EPC 148. One of the network paths 124 is relayed via the satellite 122, while one of the network paths 124 (identified as 124' in FIG. 1C) is a terrestrial path. The path selection from network paths 124 or network path 124' for a MP-BB between the EPC 148 and the eNodeB 144 is policy based by the NTP functionality. The network 100 of FIG. 1C may connect a terminal (wired or wireless) 146 to a server 149, for example, an Internet of Things (IoT) server. The NTP may use a transport metric to dynamically select distribution weights for the traffic flow of the MP-BB over the paths used by the MP-BB.

Transport aware bonding on an MP-BB provides peers/ entities at a remote site and a gateway to determine or select traffic paths based on a transport condition. The transport condition may be reflected in transport metrics of an inroute link, an outroute link, or both links. Some metrics listed below may not be usable together at the same time. Some of the metrics may be used as a group. Different metrics may be given different weights when determining or selecting a traffic path for the MP-BB. Exemplary transport metrics may include:

inroute stream error rates on inroute paths
  inroute Transport Layer Queue depths and priority
  inroute Transport Layer Queue latency
  TDMA vs SCPC link
  latency and jitter of inroute traffic on the paths
  congestion level in the inroute direction on the paths
  inroute stream bandwidth assignment history on the paths
  the current inroute symbol rate, modulation and coding rates on the paths
  outroute SQF or signal strength on the paths
  outroute Transport Layer Queue depths and priorities
  outroute Transport Layer Queue latency
  outroute Packet Loss rates on the paths
  outroute congestion level on the paths
  the current outroute MODCODs (modulation and coding) on the paths
  the operational state code of the modem.

An NTP may receive link state information for each path from, for example, a modem. Inroute related transport information may be periodically propagated from each of the modems to the NTP. The transport information for a path is associated with a sub-backbone flow utilizing the path. Distribution weights for the sub-backbone flows utilized by the MP-BB are based on the transport information from the modems. In some embodiments, the MP-BB may provide high availability where traffic is always sent through a best current sub-backbone flow.

When availability is prioritized for an MP-BB, traffic maybe communicated via a sub-backflow flow with a lower error rate or packet loss, congestion rate, and has low latency and jitter. When load sharing, the selected sub-backbone flow may be based on the traffic profile. For example, real time latency and jitter sensitive traffic may be preferably sent though the sub-backbone flow providing minimum latency and jitter, and a lesser congestion level. When the traffic is not sensitive to latency and jitter but performs better with a lower packet loss rate, for example, best effort traffic, the selected sub-backbone flow may have the lowest packet loss rate with a high latency and jitter to avoid or lower retransmissions.

In some embodiments, the NTP may include predictive analytics that rely on historical data. The NTP learns from the various transport related data to determine what type of traffic is sent through a path during a selected period. The analytics may be trained on the historical data and various probability distribution graphs may be calculated for characteristics of the paths. The distribution graphs may be used by the NTP to predict a characteristic of a specific path, and thus sub-backbone flows associated with the specific path, at a certain period based on the distribution graphs of the day to route specific traffic through specific available sub-backbone flows. In some embodiments, critical traffic that is in a small volume may be sent through a plurality of sub-backbone flows by replicating the traffic. The receiver may use a slip buffer to filter out the duplicate packets. A server NTP may perform similar predictive analysis for the outroute or forward link traffic.

The ingress traffic arrives at NTP of the remote site (return traffic) or at the NTP of the gateway or network side (forward traffic). This traffic is maybe sent over the spacelink to the other end or peer NTP. One or more satellite backbone connections are created between network peers within the baseband system for each spacelink traffic class or priority. A satellite backbone connection implements a satellite friendly protocol accounting for satellite propagation characteristics like large delay. In some embodiments, user sessions (TCP or UDP or others) in a traffic class are encapsulated in the satellite backbone protocol and sent through the MP-BB corresponding to the traffic class.

A user session carried by the MP-BB may or may not be split across the multiple sub-backbone flows. In some embodiments, the split depends on traffic characteristics of the user session. When the traffic characteristics of the user session indicate a preference for a split, the split of traffic for the user session is likely to occur as packet arrival pattern for the user session is random over multiple user sessions carried or multiplexed through the MP-BB. In other words, traffic from a user session is sent simultaneously through multiple paths. The splitting may use different satellite backbones. The MP-BB may transport multiple user sessions of the same traffic class or characteristics. When the traffic characteristics of the user session indicate a preference for not allowing a split, traffic for the user session is transported only over one of the sub-backbone flows associated with the MP-BB.

In some embodiments, a satellite backbone split is done for packets transparent to user sessions being carried by the backbone, or in other words, the split process works directly on backbone packets. As such, based on a traffic arrival pattern, a user session inside the backbone may or may not get split across multipath backbones.

In some embodiments, the split process may perform a deep packet inspection to determine which user session a satellite backbone packet is carrying and determine the sub-backbone flow of the inspected packet to deterministically split a user session across paths. The splitting of packets may be transport aware. The present teachings disclose a multipath backbone connection establishment process along with the data flow and transport aware processes to determine how to split user sessions across multiple paths to improve user experience. A satellite backbone connection can be divided into three phases: connection establishment, data transfer and connection release.

Figure 2:
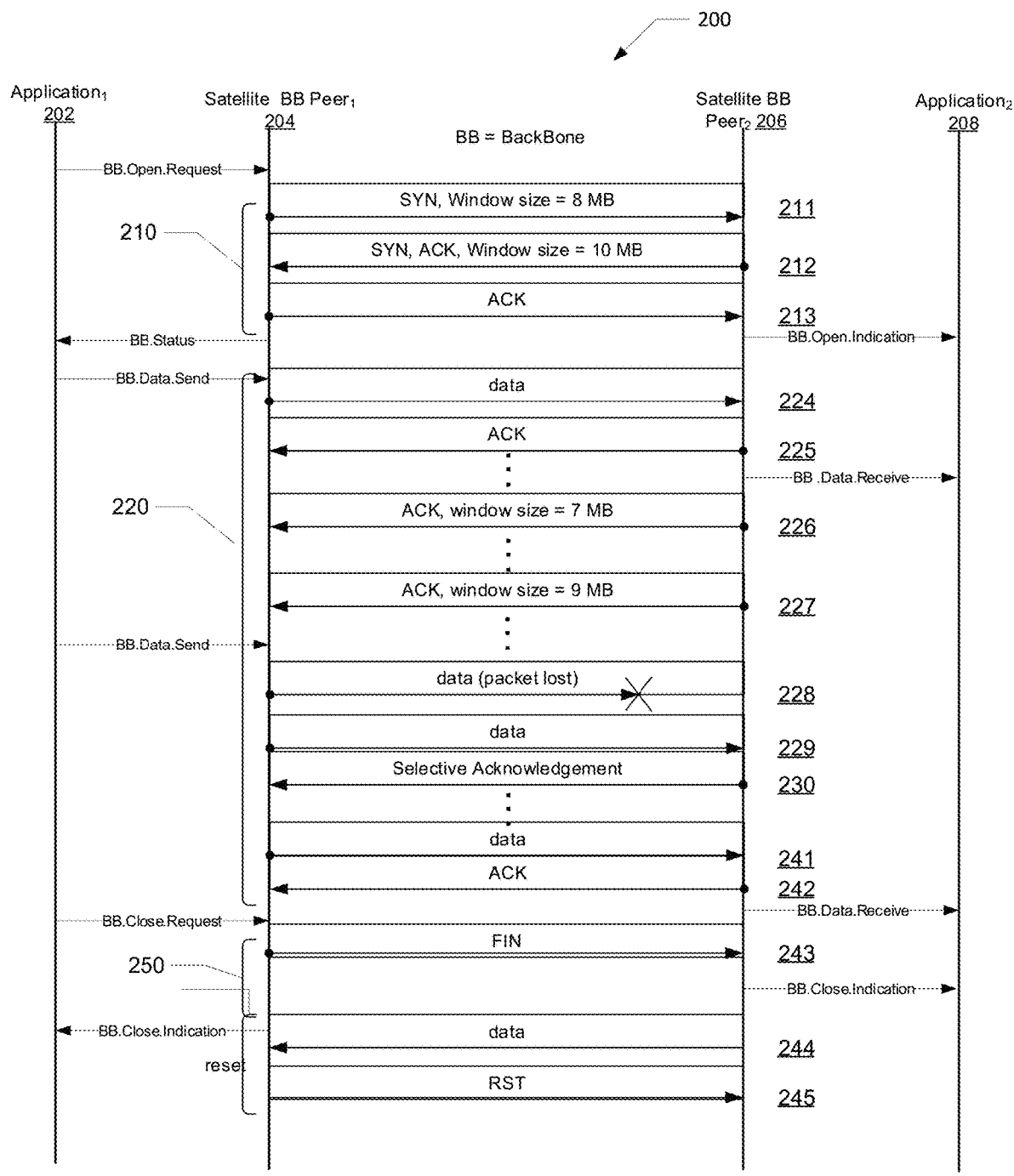
FIG. 2 illustrates a satellite backbone operation including connection establishment, data transfer and connection close according to various embodiments.

FIG. 2 illustrates a satellite backbone operation including connection establishment, data transfer and connection close according to various embodiments.

A satellite multipath backbone (MP-BB) 200 may connect an application 202 to an application 208. The MP-BB 200 may be provided via a peer 204 communicating with a peer 206 over a satellite (not shown). The MP-BB 200 may have three phases including connection establishment 210, data transfer 220 and connection close 240.

Connection establishment 210 may start with a three-way handshake. The application 202 sends a SYN packet 211 which contains a port number and initial sequence number (a satellite backbone sequence number may work at packet level in this respect), and may contain an option to request a multipath backbone to negotiate a use of backbone connection extensions, The server replies with a SYN+ACK packet 212, acknowledging the SYN and providing the server's initial sequence number and the options that supports. The sequence number is counted as the segment number (not the bytes number). The client acknowledges the SYN+ACK via an ACK packet 213 and the reliable backbone connection is now fully established.

After the connection handshake by the ACK packet 213, the application 202 and application 208 can begin the data transfer 220 phase, and may send data packets (224, 225, 226, 227, 228, 230, 241, 242 known as satellite backbone segments. A satellite backbone segment may encapsulate user IP packet. The segment number is used to delineate backbone packets, reorder them and detect losses. The backbone packet header may include the acknowledgement number of backbone segments as received. Various techniques, such as basic Selective Acknowledgement, enhanced SACK with poll request/response, Go Back N are used by the backbone protocol to handle the over the air lost segments. The sender maintains retransmit timer which is auto adjusted based on the current traffic condition. Typically, a satellite backbone connection is never closed unless it is needed due to fatal error condition. A satellite backbone is closed in the close connection phase 250 by sending RESET packet (243, 244, 245).

Multipath satellite backbone allows multiple backbone sub-backbone flows to be setup for a single backbone session. A multipath Satellite backbone session starts with an initial sub-backbone flow similar to a regular satellite backbone connection. After the first multipath backbone sub-backbone flow is set up, additional sub-backbone flows can be established. Each additional sub-backbone flow also looks similar to a regular satellite backbone connection, but rather than being a separate connection, the sub-backbone flow is bound into an existing multipath backbone session. Data for this multipath backbone connection can then be sent over any of the active sub-backbone flows that has the capacity to take it including sending over both sub-backbone flows simultaneously. As such, multipath Satellite backbone connection has different characteristics than a regular Satellite backbone connection.

Figure 3:
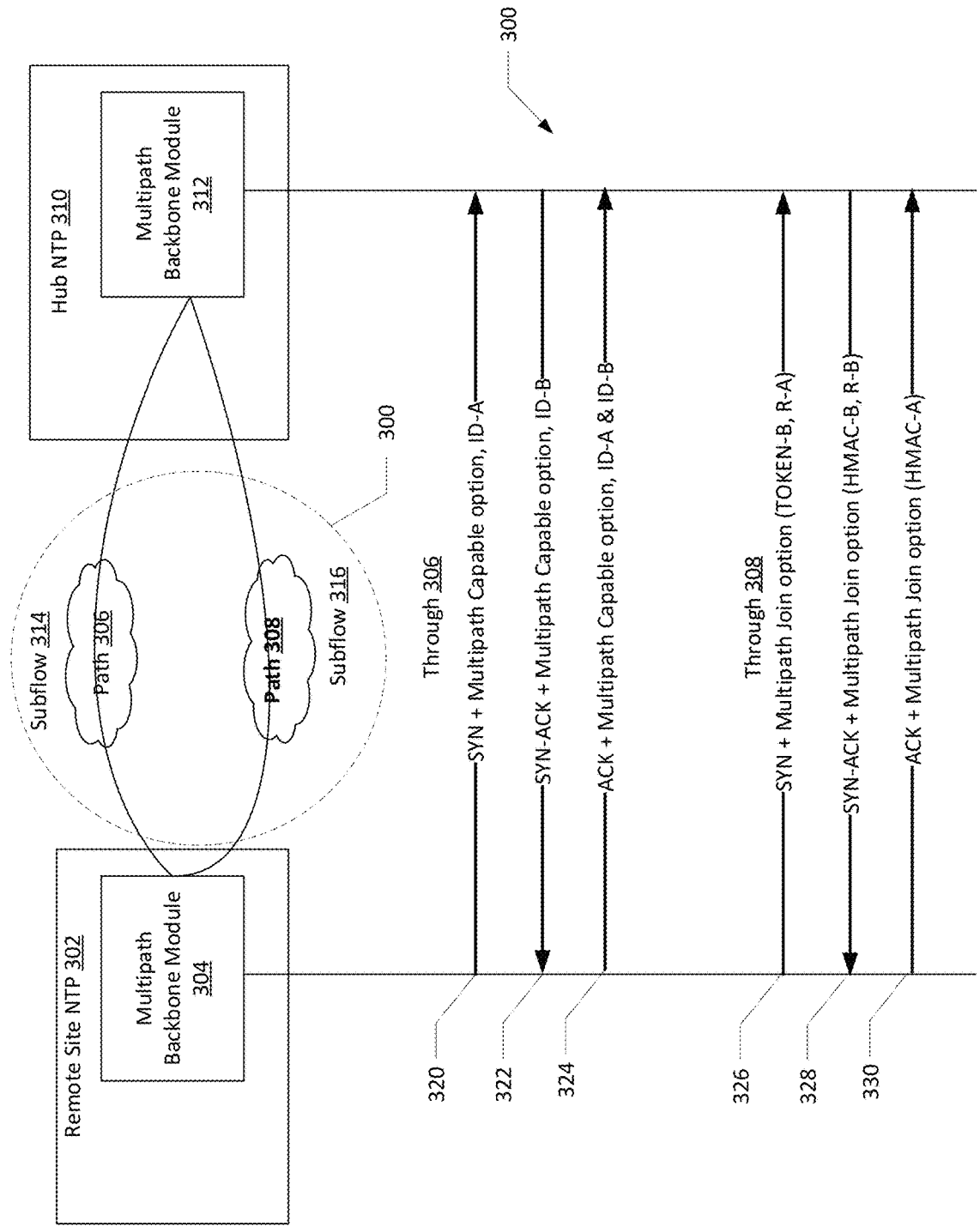
FIG. 3 illustrates a multipath satellite backbone connection establishment according to various embodiments.

FIG. 3 illustrates a multipath satellite backbone connection establishment according to various embodiments.

FIG. 3 illustrates a multipath satellite backbone connection establishment packet flow between a remote site NTP 302 at a remote site and a peer NTP 310 at a gateway via two communication paths 306, 308. The remote site NTP 302 and the peer NTP 310 include a multipath backbone module 304 and 312, respectively. First, the remote site NTP 302 sends a SYN segment 320 to the peer NTP 310 through path 306. The SYN segment 320 includes the satellite backbone Multipath capable option indicating that the remote site NTP 302 supports a multipath satellite backbone. The option fields also contain an identification, herein ID-A, chosen by the remote site NTP 302. The peer NTP 310 at the Gateway replies with a SYN+ACK segment 322 containing the Multipath Capable option and the identifier chosen by the peer. The remote site NTP 302 completes the handshake by sending the ACK segment 324. At this point, the multipath Satellite backbone connection is established with a sub-backbone flow 314 via the path 306. Now client and server backbone peers (not shown) can exchange data segments via the sub-backbone flow 314 on the path 306. The remote site NTP 302 then performs a SYN handshake 326 on path 308 to create a sub-backbone flow connection 316 on behalf of the same client and server backbone peers before sending any backbone packets over path 308. The SYN handshake 326 carries the Multipath Join option providing enough information to the peer NTP 310 to securely identify the correct backbone connection with which to associate the sub-backbone flow 316. The peer NTP 310 then replies with Multipath Join option in the SYN+ACK segment 328 and the backbone sub-backbone flow 316 is established after an ACK segment 330 is sent from the remote site NTP 302. The sub-backbone flow 314 and sub-backbone flow 316 together define a multipath satellite backbone connection 300.

A set of sub-backbone flows associated with a multipath Satellite backbone connection may be alterable, for example, by adding or removing a sub-backbone flow over a path throughout the multipath Satellite backbone connection's lifetime. After establishing two sub-backbone flows 314, 316 over the paths 306, 308, the remote and server peers of a multipath Satellite backbone can send and receive backbone data segments through two paths (using two sub-backbone flows) for one multipath Satellite backbone connection.

In some embodiments, the remote site NTP 302 or the peer NTP 310 can determine which sub-backbone flow transports a particular type of traffic. When there are multiple sub-backbone flows associated with one Satellite backbone connection, the sub-backbone flows may show different transport characteristics. Therefore, the data segments sent over the two sub-backbone flows may not be received in order. A regular satellite backbone uses the packet or segment number as the sequence number in each backbone packet header to put data back into the original order. In one embodiment, the multipath satellite backbone would reuse this sequence number as is.

In some embodiments, the multipath Satellite backbone may use its own packet sequence numbering space that is different than and in addition to a sequence number used in the regular satellite backbone connection. Each backbone packet sent by the multipath satellite backbone may include two sequence numbers: the sub-backbone flow sequence number inside the regular backbone header, and an additional multipath sequence number carried inside a satellite backbone option field. This ensures that the packets sent on a sub-backbone flow have consecutive sequence numbers and do not upset other implementations of a satellite backbone.

Figure 4:
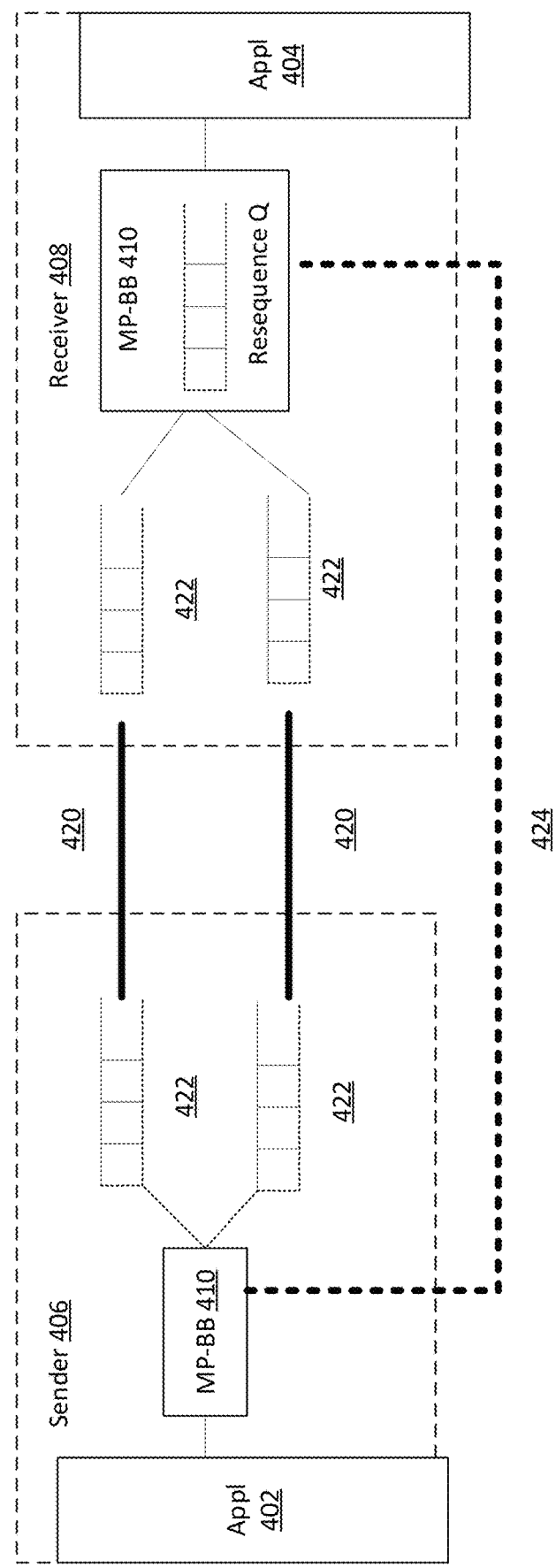
FIG. 4 illustrates a reassembly procedure at a receiving end for a multiple backbone flow or connection using two sub-backbone flows on two paths according to various embodiments.

FIG. 4 illustrates a reassembly procedure at a receiving end for a multiple backbone flow or connection using two sub-backbone flows on two paths according to various embodiments.

In a multipath satellite backbone, multiple bearers carry multiple sub-backbone flows 420 of a backbone 410 and out of order packet delivery (not packet loss) may be prevalent. A receiver 408 may use a sequence number of the sub-backbone flow 420 to ascertain if there is any packet loss on a corresponding path of a sub-backbone flow 422 from a sender 406. A multipath/global sequence number 424 for a session can send some sequence numbers on one path and remainder sequence numbers on the other path, and these sequence numbers are used by the multipath backbone to determine out of order packet delivery across the sub-backbone flows.

An application 402 may use a connection of various types, for example, a spoofed TCP, UDP, unspoofed TCP, UDP/RTP, QUIC, ICM, or the like to communicate with a peer application 404 over the multipath backbone 410.

The receiver 408 uses the sub-backbone flow sequence number 420 to determine if there is any loss on the path used by an associated sub-backbone flow. The retransmission of packets in the spacelink may take place with the sub-backbone flow 422 using existing backbone retransmission schemes, such as Basic Selective ACK, Poll based SACK, Go Back N or the like. The receiver of sub-backbone flows, for example, the multipath backbone module 304, 312 of FIG. 3, may put back packets from the sub-backbone flows 422 in correct order based on the multipath/global sequence number 424. In some embodiments, the multipath backbone module 304, 312 of FIG. 3, may maintain an integrity of the received network traffic by discarding a duplicate of the received network traffic.

In some embodiments, a delay difference between two paths may vary dynamically over time. When the same satellite constellation is used for both paths, the delay difference is the contribution from the earth station while the propagation delay remains the same (the variation is at micros level which is negligible) through two paths. When disparate constellations are used, for example GEO for one path and LEO for the other path, the delay difference may come from multiple sources, for example, earth station delay, propagation delay, satellite delay or the like. The present teachings disclose a smart splitter Multipath Satellite Backbone Protocol (Smart MP-BBP). Continuous measurement of RTT takes place to determine the congestion on each path. When one path is congested, more segments are sent through the other path to come out from the congestion. The smart splitter may detect that the path is moving towards congestion instead of waiting till the path is congested (make before break). The resequencing of out of order packets at the receiver 408 incurs latency of packets, which gets worse when delay difference between the two paths high. A smart splitter may send packets through the higher delay link ahead of packets through the lower delay link. Packets queued behind front packets or arrived later are sent earlier where sequence number of packets sent through the higher delay path packets is greater than that of lower delay link to mitigate large delay differences between two paths.

Unlike TCP, a satellite backbone protocol may distinguish between packet loss over the spacelink and the real congestion due to the bandwidth contention. TCP treats packet loss and congestion in the same way and so TCP throughput suffers when operated over the satellite link. A satellite backbone and spoofed TCP may avoid treating space link errors as congestion.

A multipath backbone congestion control may provide for fairness between backbone connections. If a multipath Satellite backbone shares a bottleneck link with other regular backbones (non-multipath), the multipath Satellite backbone should not get more throughput than the regular Satellite backbone connections. Also, performance of all the multipath satellite backbone sub-backbone flows together should match or exceed a performance of a regular backbone on any of the paths used by the multipath backbone connection; this ensures that there is an incentive to deploy Multipath Satellite backbone. In some embodiments, the multipath satellite backbone prefers efficient paths to send more of the traffic rather than paths experiencing less congestion and/or less packet loss.

A MP-BB may provide for load balancing of traffic. When a multipath backbone is using two unevenly loaded paths, the multipath transport will prefer the unloaded path and push most of the traffic there; this decreases the load on the congested link and increases it on the less congested one. If enough flows are multipath, congestion is evenly spread out across the paths or links creating a "resource pool" or bonded links that act together as if they are a single, larger-capacity link shared by all flows.

Each sub-backbone flow of a multipath backbone congestion control may have a window that is decreased when congestion is detected. Resource pooling or bonding may be implemented in the increasing phase of congestion control to allow a less-congested sub-backbone flow to increase proportionally more than a congested sub-backbone flow. Finally, the total increase of a multipath backbone's traffic across its sub-backbone flows is dynamically chosen to provide fairness and performance.

Each backbone sender maintains a sliding window to govern the number of packets that the sender can send without waiting for an acknowledgement. Flow control may be realized in two areas: a peer to peer backbone flow control, and local flow control between the backbone and the application. A sliding window-based flow control is used between peers of a backbone connection. For a multipath backbone, at the sub-backbone flow level, the sliding window-based flow control is equivalent to a flow control of a regular backbone connection. The sliding window regulates the sender window of each sub-backbone flow. A shrinking window for a sub-backbone flow indicates increasing congestion. The congestion status may be provided to the multipath satellite backbone module to regulate the splitting of packets between the multiple paths. In case of a deep congestion of a path, the sub-backbone flow corresponding to the path may be taken out or removed from the multipath backbone.

Local flow control determines the window size that a TCP Spoofing Kernel (TSK) application advertises for each spoofed TCP connection. This can be tricky as one TCP session can be carried simultaneously across two paths where at some instant one path is congested and other not congested. As the smart splitter acts on the congestion indicator from the sub-backbone flow level, the local flow control may consider that each sub-backbone flow reports to the MP-BB module about the availability of the buffer. The MP-BB may add up buffer availability of its sub-backbone flows and the aggregated buffer availability may be used to calculate a local TCP window size advertisement.

Transport metrics may include data identified below, applied to both an inroute and an outroute link. Some of metrics may not be combined with the other metrics when selecting a path or sub-backbone flow for sub-backbone flow initiation or traffic.

Inroute stream error rates on both inroute paths or through two IDUs
Inroute Transport Layer Queue depths and priority
Inroute Transport Layer Queue latency
Inroute TDMA versus SCPC link
Latency and jitter of inroute traffic on both paths
Congestion level in the inroute direction on both paths
Inroute Stream bandwidth assignment history on both paths
The current inroute symbol rate, modulation and coding rates on both paths
Outroute SQF or signal strength on both paths
Outroute Transport Layer Queue depths and priority
Outroute Transport Layer Queue latency
Outroute Packet Loss rates on both paths
Outroute congestion level on both paths
The current outroute MODCODs (modulation and coding) on both paths.
The operational state code of the modem Each multipath backbone may assign weights for its sub-backbone flows. Distribution of traffic over the multiple paths may be based on the sub-backbone flow weights. For example, a 1:2 weight between two sub-backbone flows A and B results in sub-backbone flow B transporting twice the traffic of sub-backbone flow A. The weight can be determined based on a metric or a group of metrics. For instance, if only MODCOD is used to calculate sub-backbone flow weights and achievable MODCOD on an associated path (path for the sub-backbone flow A) is 16PSK 2/3 and that on other path (path for the sub-backbone flow B) is QPSK 2/3, the weight between two sub-backbone flows may be set as 2:1. Based on the sub-backbone flow weights, the multipath backbone sends traffic through sub-backbone flow A that is twice of sub-backbone flow B. Multiple metrics can be used together to calculate sub-backbone flow weights. Within metrics, different weightages can be allocated for the metrics so that one metric has a greater influence than another metric when calculating sub-backbone flow weights. For example, given three transportation metrics MODCOD, queue latency (congestion), link error rate as listed in Table 1 below, the sub-backbone flow (path) weights may be calculated as:

Path $A$:Path $B =$ $$\frac{\text{Path } A_{MODCOD}}{\text{Path } B_{MODCOD}} * 50\% + \frac{\text{Path } A_{Latency}}{\text{Path } B_{Latency}} * 25\% + \frac{\text{Path } A_{Link\ Error}}{\text{Path } B_{Link\ Error}} * 25\% =$$

$$\frac{4}{2} * \frac{1}{2} + \frac{100}{200} * \frac{1}{4} + \frac{.0002}{.004} * \frac{1}{4} = 1 + \frac{1}{8} + \frac{1}{80} = \frac{91}{80}$$

TABLE 1

| Metric | Path A value | Path B value | Weight |
| --- | --- | --- | --- |
| MODCOD | 16APSK 2/3 | QPSK 2/3 | 50 |
| Queue Latency | 200 ms | 100 ms | 25 |
| Link Error | 4 × 10–3 | 2 × 10–4 | 25 |

In this example, the sub-backbone flow weights between sub-backbone flow A and B is appropriately 9:8. As such, 52% of backbone traffic may be sent through sub-backbone flow A and 48% through sub-backbone flow B.

In another example, when SCPC and TDMA technologies are used on the return direction for two paths, the SCPC link may be filled first before sending traffic on TDMA path.

When a link/path experiences too many errors or is about to lose communication, the sub-backbone flow associated with the failing link may be removed from a multipath satellite backbone. When the link condition improves, the sub-backbone flow may be reinstated, if necessary. In some embodiments, the instantiation of sub-backbone flows of a multipath backbone may be dynamic based, for example, on a transport condition, path availability, congestion (described above) or the like.

A satellite backbone may carry multiple user sessions of the same traffic class and priorities. When user sessions for a multipath satellite backbone are classified as conversational (carrying real time traffic), the NTP may replicate traffic on the sub-backbone flows of the multipath backbone to minimize packet loss. In this embodiment, the receiving end may reorder packets for the MP-BB with a slip buffer. The MP-BB may be used for throughput bonding, efficient congestion handling, improving Quality of Service, link availability, resource efficiency, bonding based throughput increase, resiliency and reducing underutilization. In some embodiments, when a path or link is very unstable, the MP-BB may opt not to use a sub-backbone flow through the unstable path as effective throughput may decrease (as compared to the value that can be obtained through one path) due to excessive retransmission.

In some embodiments, an MP-BB may provide user session aware splitting. When an MP-BB splits packets at the backbone segment level without determining a user session type of a connection the packets are randomly distributed over the various sub-backbone flows (and associated path) for a TCP connection (for example, a MP-BB can carry any type of user packets). When satellite backbones are per traffic class, they carry traffic with mostly similar characteristics. In some cases, it may be enough to work at the backbone segment level without looking into each user session with respect to the multipath operation. However, in other cases, treating each user session or connection individually in regard to the multipath splitting may be more efficient.

Due to delay difference and resequencing at the receiving end, extra packet latency may be introduced for multipath splitting. Delay sensitive and/or short-lived TCP connections or UDP sessions may be handled in a different way in the context of a multipath backbone. These kind of connections and sessions may be identified within a backbone and treated individually, and not at the backbone segment level. Some TCP connections may be sent through only one path or sub-backbone flow, while other packets from other TCP connections are algorithmically sent among sub-backbone flows based on characteristics of individual TCP sessions. A flow-based differentiation in multipath splitting may be used when multiple flows are being carried by a satellite backbone. A satellite backbone segment may multiplex multiple small TCP segments inside it. In this case, TCP segments (TSK packet, spoofed TCP packet) of TCP connections that require use of only one path are marked accordingly to inform the same to the multipath backbone entity. A backbone segment may be designated to not multiplex specially marked TSK packets (TCP segment) with other packets. In some embodiments, one backbone segment may not multiplex special TCP segments from different paths. A flag in the backbone header may indicate that these backbone segments are carrying TCP segments that follow only one path or one sub-backbone flow. Unless there is a hole due to packet loss, these segments can skip the MP-BB resequence queue and be directly delivered from the sub-backbone flow to the TSK at the receiving end.

In some embodiments, a satellite backbone carries traffic of similar characteristics, but within the satellite backbone some backbone traffic may be provided subtly different handling. Multipath backbone splitting may not be session blind. For example, different TCP user sessions on a backbone may require different throughputs. Moreover, a backbone can carry different protocols, for example, TCP, UDP, QUIC or the like. When differentiated throughput is needed between sessions within a backbone, the session aware splitting sends more packets from a lower throughput session on a sub-backbone flow associated with a more congested or weaker link path, and send more packets through a sub-backbone flow associated with a lesser congested path for the higher throughput sessions. In some embodiments, a backbone may carry a variety of latency and jitter sensitive applications, for example, a voice call, a video streaming over HTTP(s), an ICMP ping to test the latency of the path or the like. The MP-BB may keep a voice call through a sub-backbone flow associated with a path providing a best latency and jitter, while a stream (for example, a video stream) that can tolerate more jitter (for example, due to buffering) than the voice call may be split through two paths to get better throughput. A ping request can be duplicated or replicated across the multipaths.

QUIC and Multipath

QUIC is a transport layer network protocol to support a set of multiplexed connections between two endpoints over User Datagram Protocol (UDP) that provides security protection equivalent to TLS/SSL, along with reduced connection and transport latency, and bandwidth estimation in each direction to avoid congestion. QUIC's main goal is to improve perceived performance of connection-oriented web applications currently using TCP. QUIC also moves control of the congestion avoidance algorithms into the application space at both endpoints, rather than the kernel space, which it is claimed will allow these algorithms to improve more rapidly.

QUIC has implemented its own identifier for unique connection called the Connection UUID. The connection ID is transmitted in clear. The same multipath forwarding methods (where a connection is split into two paths simultaneously carrying traffic from a single connection) can be applied on QUIC sessions.

Figure 5:
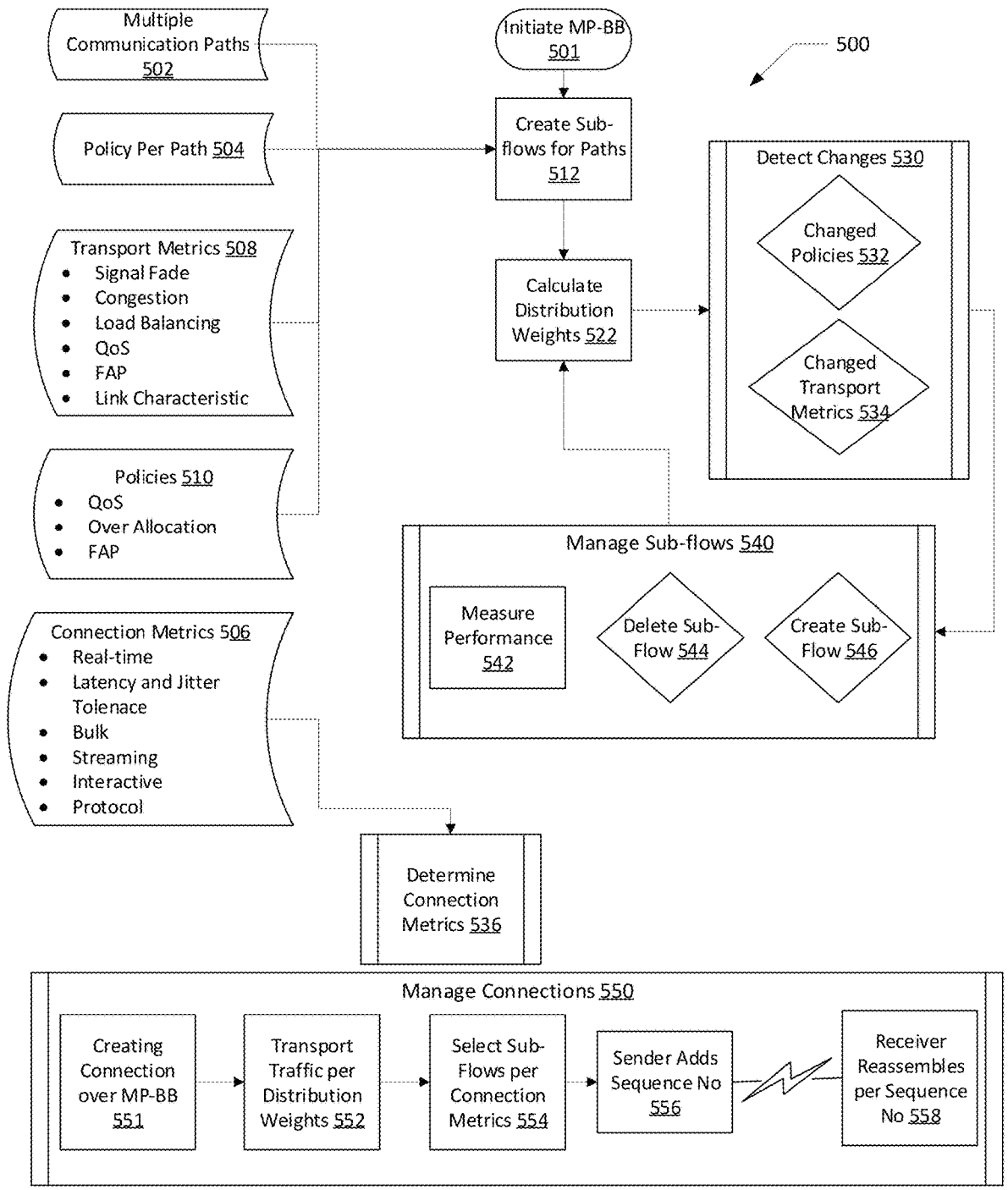
FIG. 5 illustrates a process for initiating and managing a multipath backbone according to various embodiments.

FIG. 5 illustrates a process for initiating and managing a multipath backbone according to various embodiments.

FIG. 5 illustrates a process 500 for initiating and managing a multipath backbone. An initiation of multipath backbone 501 starts by creating sub-backbone flows over some or all the multiple communication paths 502 with operation 512. See for example FIG. 2. The operation 512 retrieves available multiple communication paths data 502 and policies per path data 504. The operation 512 also retrieves, for a given path, connection metrics 506, transport metrics 508, and policies 510. Operation 512 then selects paths based on the retrieved data 502, 504, 506, 508, 510 as disclosed above. Operation 512 may also select paths based on parameters provided by the initiation operation 501.

After creating sub-backbone flows per operation 512, the process 500 then calculates distribution weights for the sub-backbone flows per operation 522, for example, as described above. After operation 512, the process 500 begins to detect changes at the link/transport layer at operation 530. The detect changes operation 530 detects changes to the transport metrics data 508 per operation 532 and the policies data 510 per operation 534. When operation 530 detects changes, the process 500 then manages sub-backbone flows per operation 540. Changes to the transport metrics data 508 or the policies data 510 may necessitate deleting a sub-backbone flow associated with the multipath backbone per operation 544. Changes to that metrics data 508 or the policies data 510 may necessitate creating a sub-backbone flow associated with them multipath backbone per operation 546. Within the managed sub-backbone flows operation 540, the process 500 may measure or calculate performance metrics of the multipath backbone per operation 542. The performance measurement may calculate resource efficiency, bonding based throughput increase, resiliency and reduction in underutilization. When an MP-BB compares unfavorably with a single path satellite backbone for one or more of the performance metrics, the number of sub-backbone flows (paths) associated with the MP-BB may be altered, for example, by deleting a sub-backbone flow, creating a sub-backbone flow, changing the distribution weights for the sub-backbone flows of the MP-BB, and the like, After managing the sub-backbone flows 540, the process 500 may again calculate distribution weights per operation 522.

In exemplary embodiments, the transfer metrics data 508 may include metrics that indicate whether the transport/path/link is experiencing a signal fade, is congested, needs to be load balanced, is working in accordance with quality of service requirements, is working in accordance with the Fair Access Policy (FAP) of the path, or other transport/path/link specific metrics.

In exemplary embodiments, the policies data 510 may indicate whether policies associated with the connection such as quality of service, over allocation, FAP, path or the like. The policies data 510 may be at a subscriber level, a path level, the system level, a VNO level, a beam level, a gateway level, or the like.

After initiating the multipath backbone per operation 501, the multipath backbone is available for managing connections per operation 550 over the multipath backbone. The process 500 includes operation 551 to create connections over the multipath backbone. Connection creation per operation 551 may populate connection metrics data 506. In exemplary embodiments, the connection metrics data 506 may include a real-time connection indicator, a latency and jitter sensitivity, a bulk connection, an interactive connection, a protocol in use on the connection, life expectancy (short-lived or not) and other connection specific metrics.

The managing per operation 550 may transport traffic over the multipath backbone per operation 552 based on the distribution weights calculated in operation 522. The managing per operation 550 may select sub-backbone flows for a connection based on the connection metrics 506 of the connection. Periodically operation 536 may determine connection metrics based on historical data may be calculated and the associated connection metrics 506 may be updated.

The managing per operation 550 may add a sequence number to each packet transported over the multipath backbone at the sender per operation 556. The transport of the packets may select sub-flows of the multipath backbone per the connection metrics per operation 554. A receiver reassembles connection packets per sequence number in operation 558.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. A method for providing a multipath satellite backbone, the method comprising:
   creating sub-backbone flows over multipaths between a first peer and a second peer, wherein each of the sub-backbone flows is associated with one of the multipaths;
   retrieving a policy corresponding to the first peer, the second peer and each of the multipaths;
   receiving a transport metric for at least one of the multipaths;

calculating distribution weights for the sub-backbone flows based on the policy and the transport metric; and splitting, based on the distribution weights and the policy, a network traffic between the first peer and the second peer over the sub-backbone flows, wherein at least one of the multipaths is relayed by a satellite.

2. The method of claim 1, wherein the transport metric is selected from one or more of a carrier frequency band, a satellite constellation, an antenna, a carrier frequency, a gateway identification, an outdoor unit, a Packet Loss Rate (PLR), a Modulation and Coding (MODCOD) symbol rate, a MODCOD, a congestion level, an interface cost, a latency, a jitter, a signal strength, a transport layer queue depth, a transport layer queue latency or a link type.

3. The method of claim 2, wherein the multipaths are relayed by the satellite.

4. The method of claim 2, further comprising:

detecting, on one of the multipaths, a change in one or more of the transport metric or the policy; and managing the sub-backbone flows based on the change.

5. The method of claim 4, wherein the change indicates that one of the multipaths is unavailable and the managing comprises deleting a sub-backbone flow of the sub-backbone flows associated with the unavailable one of the multipaths.

6. The method of claim 4, wherein the change indicates that one of the multipaths is available and the managing comprises creating a sub-backbone flow of the sub-backbone flows associated with the available one of the multipaths.

7. The method of claim 1, further comprising:

creating a connection having a connection metric on the multipath satellite backbone; and selecting, based on the connection metric, one or more of the sub-backbone flows to transport the network traffic for the connection.

8. The method of claim 7, further comprising determining a change in the connection metric; and selecting, based on the change, one or more of the sub-backbone flows to transport the network traffic for the connection.

9. The method of claim 7, wherein the connection comprises a Performance-enhancing Proxy (PEP) connection.

10. The method of claim 7, wherein the connection comprises a TCP spoof connection.

11. The method of claim 7, wherein the selecting comprises selecting a plurality of sub-backbone flows from the sub-backbone flows and the method further comprises:

sending the network traffic for the connection by replicating the network traffic over the plurality of sub-backbone flows;

receiving the network traffic for the connection over the plurality of sub-backbone flows; and maintaining an integrity of the received network traffic by discarding a duplicate of the received network traffic.

12. The method of claim 7, wherein the connection metric indicates a jitter sensitive connection, the selecting comprises selecting one of sub-backbone flows from the sub-backbone flows.

13. The method of claim 7, wherein the connection metric indicates a jitter insensitive connection, the selecting comprises selecting a plurality of sub-backbone flows from the sub-backbone flows and the method further comprises:

sending the network traffic for the connection by distributing the network traffic for the connection over the plurality of sub-backbone flows;

receiving the network traffic for the connection over the plurality of sub-backbone flows; and maintaining an integrity of the received network traffic by maintaining a sequence of the received network traffic.

14. The method of claim 7, wherein the connection metric comprises one or more of a real-time connection indicator, a latency and jitter sensitivity, a bulk connection, an interactive connection, a protocol in use on the connection, a life expectancy and the like.

15. The method of claim 7, wherein the splitting comprises flow-based differentiation and the connection is designated to use only one of the sub-backbone flows.

16. The method of claim 7, wherein the splitting comprises flow-based differentiation and the connection is designated to use a plurality of the sub-backbone flows.

17. The method of claim 1, wherein the policy is selected from one or more of a Fair Access Policy (FAP), over allocation, an allowed MODCOD, or a Quality of Service requirement.

18. The method of claim 1, wherein the creating the sub-backbone flows comprises creating the sub-backbone flows based on a predictive analysis of historical data of at least one of the multipaths.

19. The method of claim 1, further comprising:

measuring a performance metric of the multipath satellite backbone; and managing the sub-backbone flows based on the performance metric.

* * * * *